(12) United States Patent
Osada et al.

(10) Patent No.: US 11,417,115 B2
(45) Date of Patent: Aug. 16, 2022

(54) OBSTACLE RECOGNITION DEVICE

(71) Applicants: DENSO CORPORATION, Kariya (JP); TOYOTA JIDOSHA KABUSHIKI KAISHA, Toyota (JP)

(72) Inventors: Koki Osada, Kariya (JP); Takayuki Hiromitsu, Kariya (JP); Tomoyuki Fujimoto, Kariya (JP); Takuya Miwa, Kariya (JP); Yutaka Hamamoto, Toyota (JP); Masumi Fukuman, Toyota (JP); Akihiro Kida, Toyota (JP); Kunihiro Sugihara, Nagakute (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 17/069,078

(22) Filed: Oct. 13, 2020

(65) Prior Publication Data

US 2021/0110177 A1 Apr. 15, 2021

(30) Foreign Application Priority Data

Oct. 14, 2019 (JP) .............................. JP2019-188275

(51) Int. Cl.
*G06V 20/58* (2022.01)
*G06T 7/246* (2017.01)
*G06V 10/44* (2022.01)
*G06T 7/269* (2017.01)

(52) U.S. Cl.
CPC .............. *G06V 20/58* (2022.01); *G06T 7/246* (2017.01); *G06T 7/269* (2017.01); *G06V 10/44* (2022.01); *G06T 2207/10016* (2013.01); *G06T 2207/30261* (2013.01)

(58) Field of Classification Search
None
See application file for complete search history.

(56) References Cited

U.S. PATENT DOCUMENTS 8,351,653 B2 * 1/2013 Nishigaki ............... G06T 7/579
382/107
9,547,795 B2 * 1/2017 Gupta ................ G06K 9/00805

FOREIGN PATENT DOCUMENTS

JP 2009-146153 A 7/2009

* cited by examiner

*Primary Examiner* — Matthew C Bella
*Assistant Examiner* — Brian D Shin
(74) *Attorney, Agent, or Firm* — Maschoff Brennan

(57) ABSTRACT

An obstacle recognition device of a vehicle provided with a camera capturing an image around the vehicle, includes an acquiring unit sequentially acquiring the image captured by the camera; a feature point extracting unit extracting a plurality of feature points of an object included in the image; a calculation unit calculating each motion distance of the plurality of feature points between the image previously acquired and the image currently acquired by the acquiring unit; a first determination unit determining whether each motion distance of the feature points is larger than or equal to a first threshold; a second determination unit determining whether each motion distance of the feature points is larger than or equal to a second threshold; and an obstacle recognition unit recognizing an obstacle.

4 Claims, 5 Drawing Sheets

OBSTACLE RECOGNITION DEVICE

CROSS-REFERENCE TO RELATED APPLICATION

This application is based on and claims the benefit of priority from earlier Japanese Patent Application No. 2019-188275 filed Oct. 14, 2019, the description of which is incorporated herein by reference.

BACKGROUND

Technical Field

The present disclosure relates to obstacle recognition devices.

Description of the Related Art

In recent years, market expectations for autonomous driving have increased. For example, applications for performing automatic parking are required on the market. For performing automatic parking, cameras are installed on the vehicle to recognize obstacles in the vicinity of the vehicle. In order to provide cameras on the vehicle, some types of cameras such as a stereo camera and a monocular camera can be used. When monitoring areas around the vehicle, since the number of required cameras increases, as an example, an obstacle recognition system has been developed to utilize four fish-eye monocular cameras mounted at different four positions of the vehicle.

SUMMARY

The present disclosure provides an obstacle recognition device capable of accurately detecting an obstacle. Specifically, the obstacle recognition device is applied to a vehicle provided with a camera capturing an image around the vehicle. The obstacle recognition device according to the present disclosure includes an acquiring unit sequentially acquiring the image captured by the camera; a feature point extracting unit extracting a plurality of feature points of an object included in the image; a calculation unit calculating each motion distance of the plurality of feature points between the image previously acquired and the image currently acquired by the acquiring unit; a first determination unit determining whether each motion distance of the feature points is larger than or equal to a first threshold; a second determination unit determining whether each motion distance of the feature points is larger than or equal to a second threshold; and an obstacle recognition unit recognizing an obstacle.

DETAILED DESCRIPTION OF THE PREFERRED EMBODIMENTS

As a conventional technique of an obstacle recognition system, for example, Japanese patent application laid-open publication No. 2009-146153 proposes an obstacle recognition system that detects a moving object in a captured image of the camera when the own vehicle is stopped by using a frame-difference method. According to the obstacle recognition system, a moving object in the captured image of the camera is detected when the own vehicle is moving by using an optical flow method.

The inventors of the present disclosure considered a recognition technique of an obstacle around the own vehicle using an image captured by a camera when the own vehicle is moving.

According to the inventor's analysis, in the case where obstacles around the own vehicle are detected by using an image captured by the camera when the own vehicle is moving, stationary objects and moving objects may be separately recognized.

However, in this case, an obstacle for which is it not clear whether it is a stationary object or a moving object may be present. As an obstacle, a vehicle which is stopped after moving or a vehicle which starts to move from a stopped state are considered.

For example, when detecting an obstacle with an optical flow method, a plurality of feature points are extracted from an image and then a plurality of optical flows are generated for the plurality of feature points.

Among a plurality of feature points, feature points that constitute a stationary object and feature points that constitute a moving object are subtracted, and an optical flow of the remaining feature points may be used for detecting objects.

However, in this case, the number of above-mentioned remaining feature points are insufficient to recognize an obstacle.

With reference to the drawings, hereinafter, embodiments of the present disclosure will be described.

With reference to FIGS. 1 to 7, an obstacle recognition system 10 in which an obstacle recognition device 30 is applied will be described.

Figure 1:
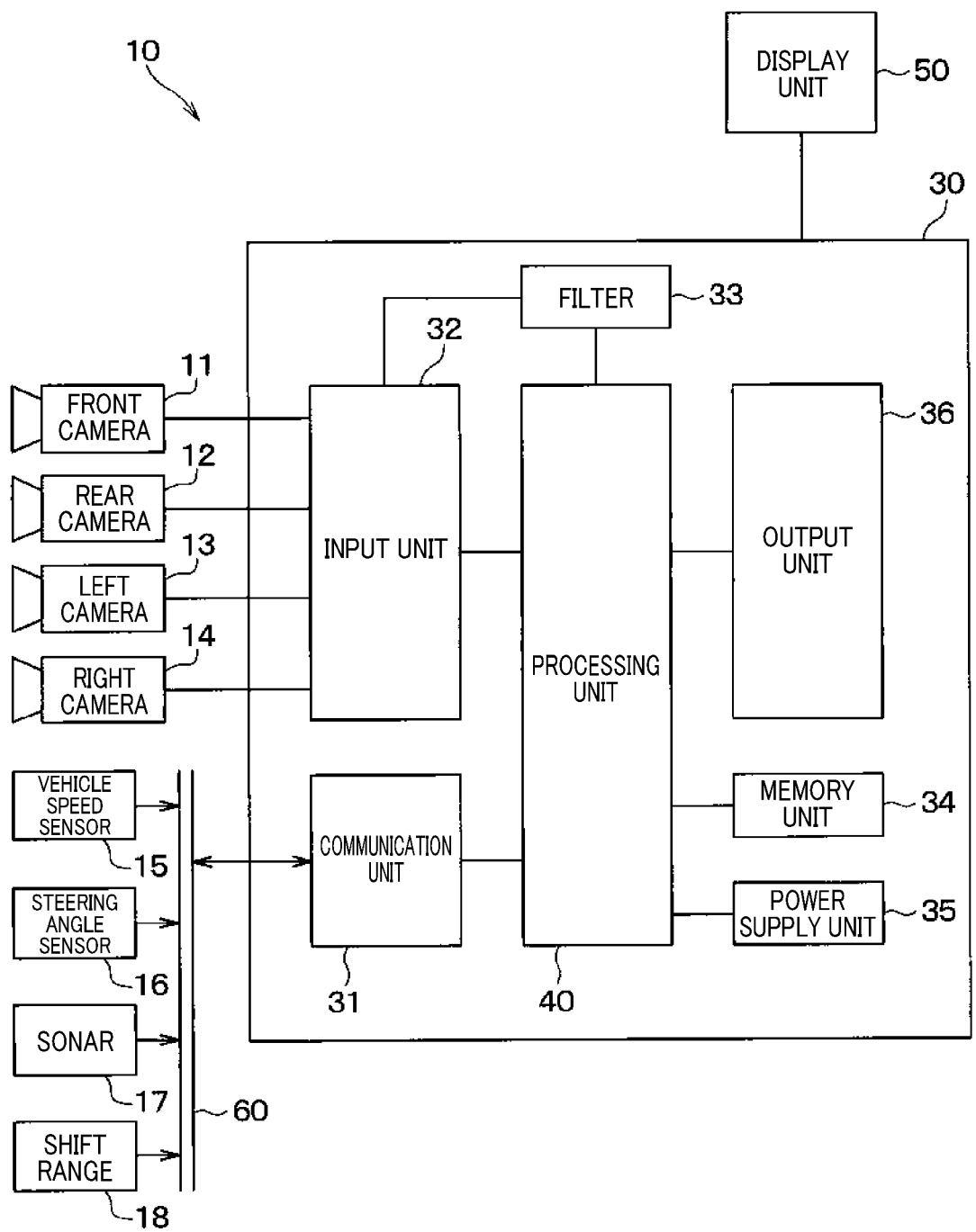
FIG. 1 is a block diagram showing an overall configuration of an obstacle recognition system of a vehicle in which an obstacle recognition device is according to an embodiment of the present disclosure.

As shown in FIG. 1, the obstacle recognition system 10 includes a front camera 11, a rear camera 12, a left camera 13, a right camera 14, an obstacle recognition device 30 and a display unit 50.

Each of the front camera 11, the rear camera 12, the left camera 13 and the right camera 14 is configured as a monocular digital camera. Hereinafter, the front camera 11, the rear camera 12, the left camera 13 and the right camera 14 are simply referred to as camera 11, camera 12, camera 13 and camera 14.

For each of the cameras 11, 12, 13 and 14 according to the present embodiment, a wide angle lens is used in which an angle of view (angle of field) is set to be 180 degrees (i.e. fish-eye lens).

The front camera 11 is mounted, for example, on a front portion in the travelling direction (e.g. radiator grill) of the vehicle, capturing a area in front of the vehicle in the travelling direction. The rear camera 12 is mounted on the rear portion in the travelling direction of the vehicle, capturing a area to the rear of the vehicle.

The left side camera 13 is mounted, for example, on a left door mirror (rear view mirror at left door side), capturing an area to the left of the vehicle in a vehicle width direction. The right side camera 14 is mounted, for example, on a right side door mirror (rear view mirror at right door side), capturing a area to the right of the vehicle in the vehicle width direction.

The cameras 11, 12, 13 and 14 each capture an image of an area around the vehicle and output captured image data indicating the captured image to an input unit 32 of the obstacle recognition device 30.

The obstacle recognition device 30 is configured as a microcomputer or the like, including CPU, ROM, RAM, I/O and a bus line that connects these units. Specifically, the obstacle recognition device 30 includes a communication unit 31, an input unit 32, a memory unit 34, a power supply unit 35, an output unit 36 and a processing unit 40.

The communication unit 31 is connected to a vehicle speed sensor 15, a steering angle sensor 16, a sonar 17 and a shift range unit 18 via a vehicle LAN 60. The vehicle speed sensor 15 outputs a signal responding to an own vehicle speed Vc as a vehicle speed to the vehicle LAN 60.

The steering angle sensor 16 outputs a signal responding to a steering angle θs of the vehicle based on a steering operation of the passenger in the vehicle to the vehicle LAN 60. The sonar 17 outputs a signal, indicating a probing result in which obstacles around the vehicle are probed with ultrasonic waves as the probing waves, to the vehicle LAN 60.

The shift range unit 18 outputs range information of an automatic transmission to the LAN 60. Thus, the own vehicle speed Vc, the steering angle θs, the probing result of the area around the vehicle using the probing waves and the shift range information are transmitted to the communication unit 31 via the vehicle LAN 60.

The input unit 32 acquires image data outputted by respective cameras 11, 12, 13 and 14 and outputs the acquired image data to the processing unit 40.

A filter 33 calculates luminance of image data of each camera outputted by the input unit 32 based on luminance of pixels in the image and the luminance in the vicinity of the pixels. The filter 33 calculates using a Gaussian filter for eliminating noise and a Sobel filter for detecting edges of the image for each camera.

Note that a processing accelerator dedicated for a filtering is used as the filter 33.

The memory unit 34 includes RAM, ROM and a writable non-volatile recording media, storing computer programs executed by the processing unit 40 (described later).

The power supply unit 35 supplies power for executing the programs to the processing unit 40. The output unit 36 outputs the image data processed by the processing unit 40 to the display unit 50.

The processing unit 40 executes a computer program stored in advance in the storing unit 34, thereby executing an obstacle recognition process.

Here, the obstacle recognition process recognizes each of a moving object around the vehicle and an intermediate object between the moving object and the stationary object.

The display unit 50 is arranged in the vehicle cabin, and displays an image to the passenger of the vehicle based on the image data transmitted from the processing unit 40 via the output unit 36. Thus, the image processed by the processing unit 40 can be visually recognized in the obstacle recognition system 10.

The obstacle recognition system 10 is configured as described above. According to the obstacle recognition system 10, the processing unit 40 of the obstacle recognition device 30 executes the computer program, to recognize an obstacle around the vehicle, thereby controlling the vehicle.

Next, operation of the obstacle recognition 30 according to the present embodiment will be described.

Firstly, the cameras 11, 12, 13 and 14 each repeatedly captures images around the vehicle at predetermined periods and sequentially outputs the captured data to the input units 32. The processing unit 40 repeatedly executes the obstacle recognition process at the predetermined periods for each camera in accordance with the flowchart shown in FIGS. 2 and 3.

A specific example in which the processing unit 40 executes an obstacle recognition process based on the captured data at each capturing outputted by the front camera 11 will be described.

First, at step S100, the processing unit 40 acquires, as an acquiring unit, the captured data for each capturing outputted by the front camera 11 via the input unit 32.

On the other hand, the filter 33 acquires the captured data at each capturing via the input unit 32 and performs a filtering process. In response to this, the processing unit 40 acquires the captured data at each capturing which are filtered by the filter 33 corresponding to the captured data at each capturing acquired from the input unit 32.

Next, at step S110, the processing unit 40, as a feature point extracting unit, extracts a plurality of feature points from the captured data at each capture which is acquired from the filter 33. As the feature points according to the present embodiment, corner portions and edges included in the image are used.

Next, at step S120, the processing unit 40 generates an optical flow using a block matching method for each of the plurality of feature points included in the image. The optical flow is a motion vector including a motion distance and a moving direction on the image at the feature point.

Hereinafter, for convenience of explanation of the feature points, the number of captures by the front camera 11 is defined as N and N−1, and the N th captured timing is defined as timing ta (N) and the N−1 th captured timing is defined as timing ta (N−1).

The processing unit 40 scans the image acquired at the (N) th capture, with the pixel blocks as a template in which the feature point T (N−1) extracted from the image acquired at (N−1) th capture is located at the center.

Figure 4:
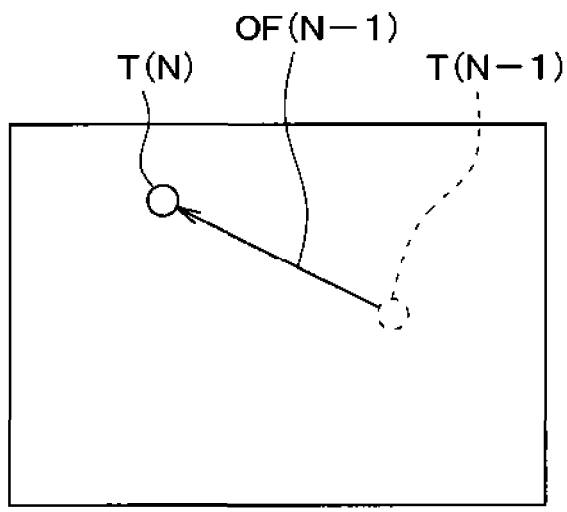
FIG. 4 is an explanatory diagram supplementary showing generation of an optical flow shown in FIG. 3, illustrating an image captured by a front camera at Nth capture.
Figure 5:
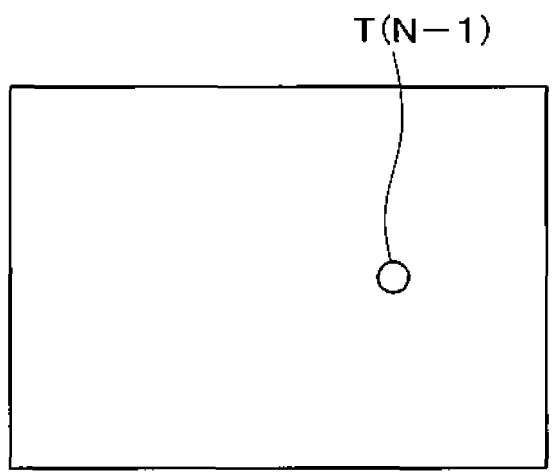
FIG. 5 is an explanatory diagram supplementary showing generation of an optical flow shown in FIG. 3, illustrating an image captured by a front camera at N−1th capture.
Figure 6:
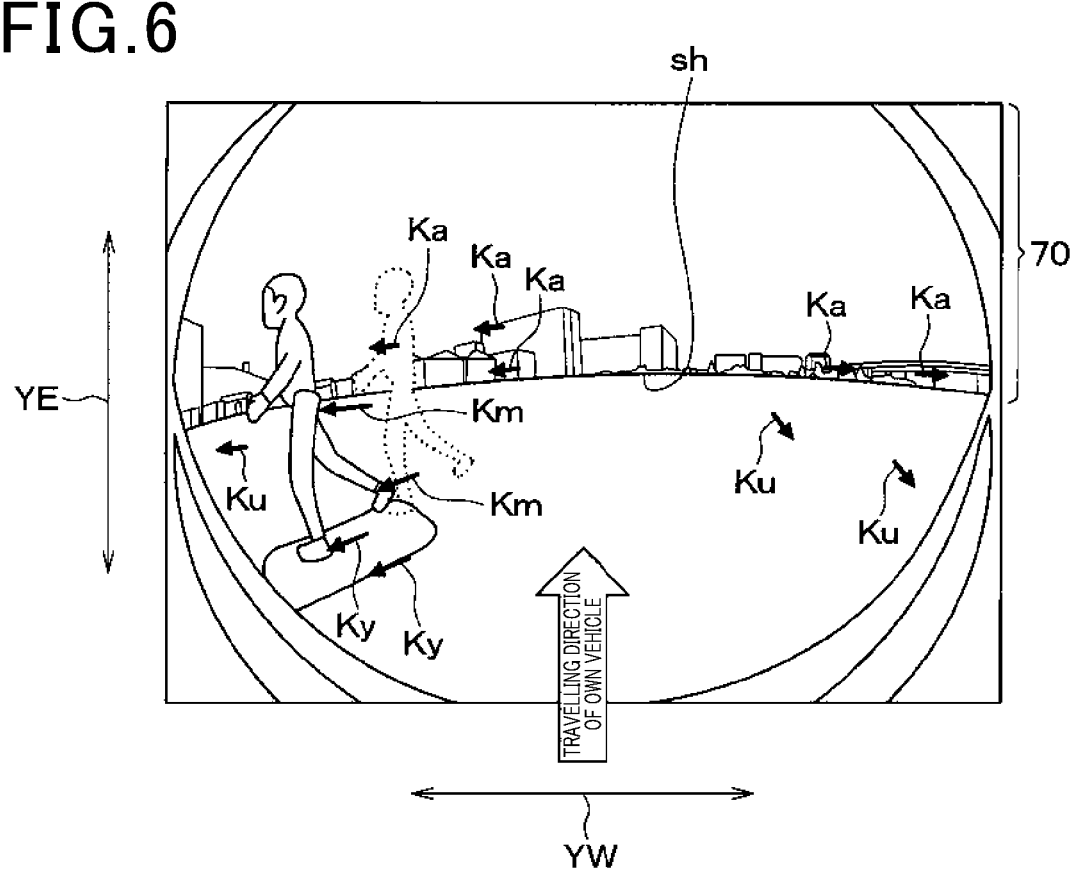
FIG. 6 is a diagram showing an image captured by a front camera to supplementarily explain the obstacle recognition process shown in FIG. 2.

At this time, the processing unit 40 calculates the difference absolute value sum (i.e. SAD) of the illuminance in the pixel block between the (N) th image shown in FIG. 4 and (N−1) th image shown in FIG. 6. Note that SAD refers to sum of absolute difference.

Thus, the processing unit 40 predicts a similarity between the feature point of the (N) th image and the feature point of the (N−1) th image.

Then, the processing unit 40 extracts, on the image acquired at (N) th capture, the feature point in which the difference absolute value sum of the luminance in the pixel block becomes minimum, to be the feature point T (N) in which the similarity to the feature point to the feature point T (N−1) becomes the maximum. Hence, the processing unit 40 extracts, on the (N) th image, the feature point T (N) corresponding to the feature point T (N−1).

Here, the feature point T (N) and the feature point T(N−1) constitute a mutual common portion (e.g. common edge) in the common object.

In other words, the feature point T (N) as a moving destination of the feature point T (N−1) is detected on the (N) th captured image. Then, the processing unit 40 as a calculation unit connects the feature point T (N−1) and the feature point T (N), thereby generating an optical flow OF (N−1) of the feature point T (N−1) as shown in FIG. 4.

The optical flow OF (N−1) represents a moving distance and a moving direction of the feature point T (N−1) on the images captured between the timing ta (N) and the timing ta (N−1).

Next, at step S130, the processing unit 40 as a moving object recognizing unit recognizes a moving object from the images captured at respective captures, in accordance with a plurality of optical flows generated at the step S120. The moving object refers to an object being displaced over time.

The recognition process of the moving object is a process for recognizing an aggregate of a plurality of feature points to be a moving object, using an optical flow method. Each of the plurality of feature points has a motion distance included in the optical flow, that is, the flow length larger than a predetermined value Ra.

Further, as the recognition process of the moving object, an aggregate of the plurality of feature points in which a change in the velocity may be recognized as a moving object.

Here, for the predetermined value Ra, a value larger than a motion distance calculated by accumulating the own vehicle speed Vc and a constant period Tm is utilized. The constant period Tm refers to a period at which respective cameras 11, 12, 13 and 14 capture images.

The change in the velocity is acquired using a motion distance included in an optical flow at each capturing. Note that a recognition process disclosed in the above-mentioned patent literature may be used for recognizing the moving object from the image.

Next, at step S140, the processing unit 40 recognizes, based on the plurality of optical flows generated at step S120, an obstacle which is intermediate between a moving object and a stationary object (hereinafter referred to as intermediate obstacle).

The intermediate obstacle refers to an object which both moves and stops at different times. Also, for example, an intermediate obstacle may be assumed as a car which is stopped after entering a parking frame in the parking space. A stationary object refers to an object which is stopped without being displaced after more than a certain time. As a stationary object, for example, a car which has been parked in a parking frame in the parking space is assumed. The obstacle recognition process at step 140 will be detailed later.

Thus, the processing unit 40 executes the obstacle recognition process based on the captured image data at each capture from the front camera 11. Also, similar to a case of the front camera 11, The processing unit 40 executes the obstacle recognition process for the rear camera 12, the left camera 13 and the right camera 14 based on the captured image data at each capture.

Thus, the processing unit 40 recognizes a moving object and an intermediate obstacle from captured image from each camera, in accordance with images outputted from the cameras 11, 12, 13 and 14.

Next, at step S150, the processing unit 40 performs an arbitrary process for a moving object and an intermediate obstacle for each camera.

Specifically, in the case where the same intermediate obstacle is detected from images captured by two or more cameras among the cameras 11, 12, 13 and 14, an arbitration process is performed in the following manner.

Specifically, it is determined whether an intermediate obstacle detected from images captured by any camera in the two or more cameras is used for vehicle control. Vehicle control refers to a control of braking the vehicle by controlling a traction motor (i.e. driving source of travelling) or a brake apparatus.

Similarly, in the case where the same moving object is detected from images captured by two or more cameras among the cameras 11, 12, 13 and 14, an arbitration process is performed in the following manner.

Specifically, the reliability of detection of the obstacle is determined for each image, and it is determined whether a moving object detected from images captured by any camera in the two or more cameras is used for vehicle control. The reliability is determined depending on the number of detections of the intermediate obstacle and a detection period of the intermediate obstacle.

Next, with reference to FIG. 3, an obstacle recognition process at step S140 according to the present embodiment will be described.

Figure 3:
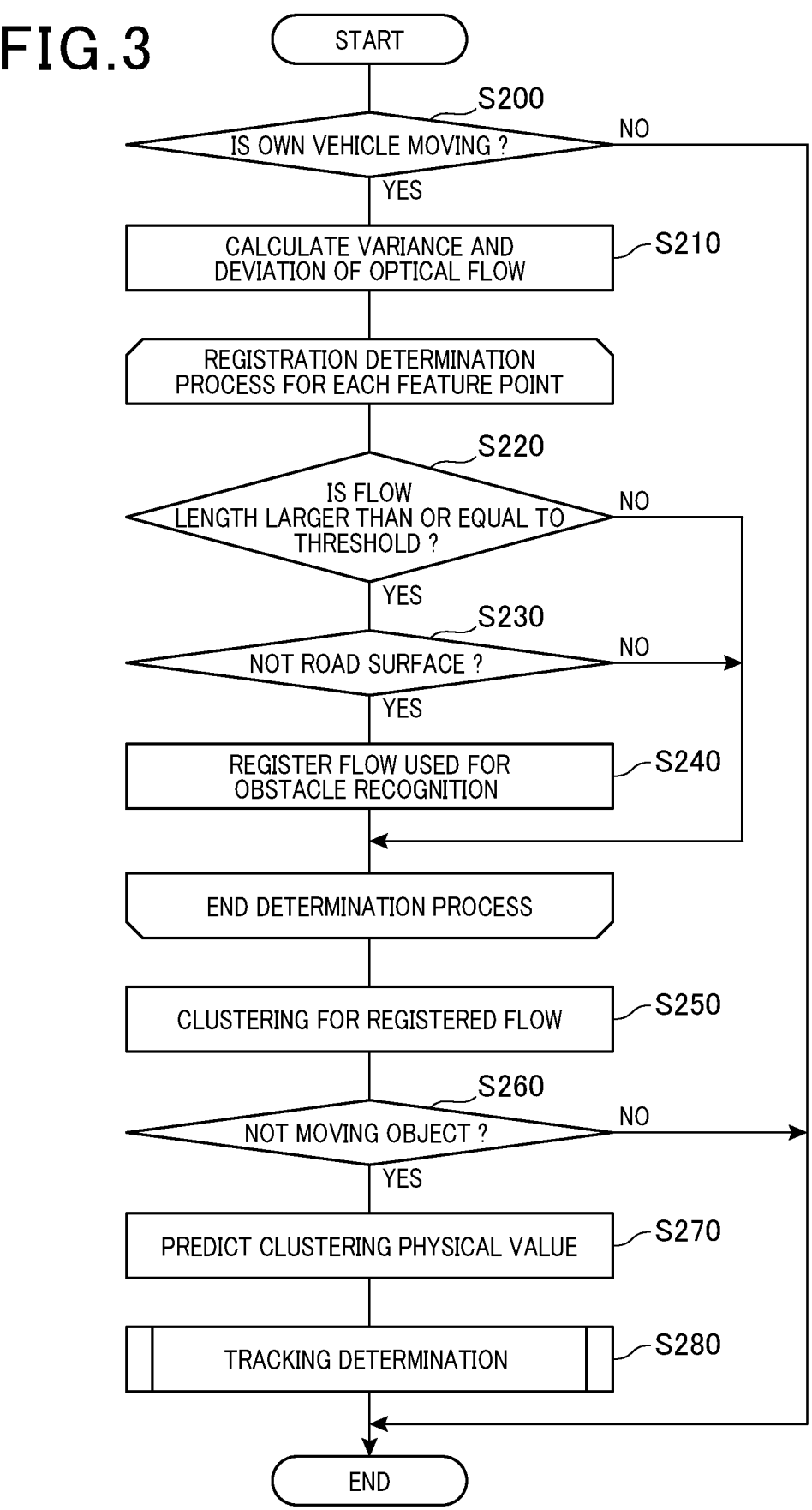
FIG. 3 is a flowchart showing a detailed process at step S130 shown in FIG. 2.

Firstly, at step S200 shown in FIG. 3, the processing unit 40 as a movement determination unit determines whether the own vehicle speed Vc detected by the vehicle speed sensor 15 is larger than or equal to a threshold, thereby determining whether the own vehicle is moving or not.

At this moment, at step S200, the processing unit 40 determines that the own vehicle is moving (step S200: YES), when the own vehicle speed Vc is higher than or equal to the threshold.

Next, at step S210 shown in FIG. 3, the processing unit 40 calculates a variance and a deviation of the flow lengths of the plurality of optical flows generated at step S120. The flow length of each optical flow refers to a motion distance of the feature point on the image. Thus, the variance and the deviation of the flow lengths of the plurality of optical flows are obtained based on the plurality of feature points in the images captured by the cameras 11, 12, 13 and 14 when the vehicle is moving.

Next, at steps S210, S220 and S240 shown in FIG. 3, the processing unit 40 performs a registration determination process for each feature point in accordance with a plurality of feature points and a plurality of optical flows obtained from images captured by the cameras 11, 12, 13 and 14 when the vehicle is moving.

Firstly, at step S220, the processing unit 40 as a first determination unit determines whether the flow length of the feature point is larger than or equal to a threshold Sa (i.e. first threshold).

According to the present embodiment, the threshold Sa refers to an upper limit value of the flow length of a stationary object in the distance on the image. Hence, at step S220, by determining whether the flow length of the feature point is larger than or equal to the threshold Sa, the process determines whether the feature point constitutes an object other than a stationary object in the distance.

According to the present embodiment, in the case where the stationary object touches the horizontal line and a distance between a portion where the stationary object touches the horizontal line and the front camera 11 is larger than or equal to a predetermined distance (e.g. 20 meters), the stationary object is defined as a stationary object in the distance (far-distance stationary object).

Generally, the flow length of the feature point in the far-distance stationary object is shorter than the flow length of an object other than the far-distance stationary object among a plurality of objects included in the image. In this respect, the threshold Sa is determined in accordance with the variance and the deviation of the flow lengths of the plurality of optical flows generated from the images.

Specifically, the threshold Sa is set to be shorter than the flow lengths of other objects taking a variation in the flow lengths of respective feature points generated from the image into consideration.

Next, at step S230, the processing unit 40 as a second determination unit determines whether the flow length of the feature point is larger than or equal to the threshold Sb (i.e. second threshold), thereby determining whether each of the feature points constitutes an object other than a road surface (i.e. the ground).

Figure 7:
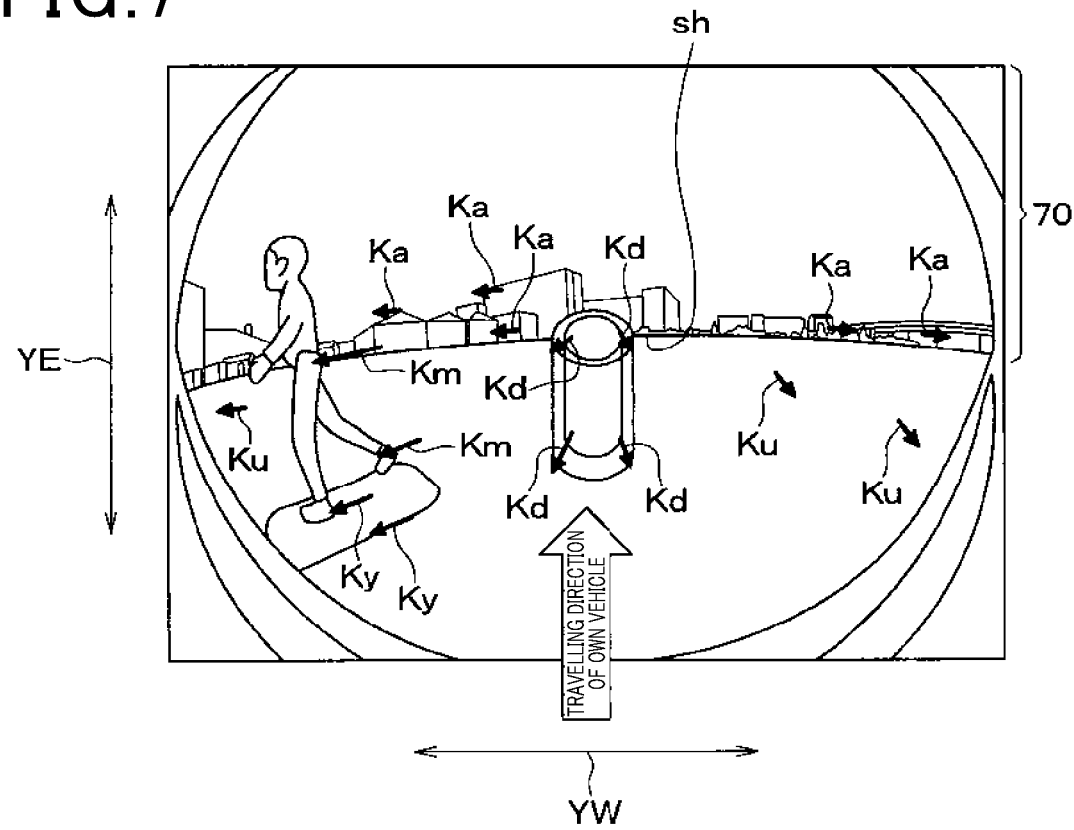
FIG. 7 is a diagram showing an image captured by a front camera to supplementarily explain the obstacle recognition process shown in FIG. 2.

Note that a width direction in the images shown in FIGS. 6 and 7 (left-right direction in the images) is defined as a width direction YW, and a direction perpendicular to the width direction YW is defined as a longitudinal direction YE.

Generally, the flow length of a feature point on the road surface (i.e. the ground) is obtained by accumulating the constant period T and the own vehicle speed Vc. The flow length becomes shorter as the location of the feature point recedes from the own vehicle along the longitudinal direction YE.

In the case shown in FIGS. 6 and 7, the flow length becomes shorter as the location of the feature point approaches the upper side from the lower side on the images shown in FIGS. 6 and 7. The threshold Sb is defined as an upper limit value of the flow length on the road surface (i.e. the ground) shown in FIGS. 6 and 7.

The front camera 11 utilizes a wide-angle lens (i.e. fish-eye lens). Hence, the flow length of the feature point on the road surface (i.e. the ground) becomes longer as the location of the feature point approaches towards one side in the width direction YW from the center portion in the width direction YW, depending on the angle of view of the wide-angle lens. Also, the flow length of the feature point on the road surface (i.e. the ground) becomes longer as the location of the feature point approaches towards the other side in the width direction YW from the center portion in the width direction YW, depending on the angle of view of the wide-angle lens.

Accordingly, the threshold Sb is set for each feature point such that the threshold Sb becomes shorter as the location of the feature point goes away from the own vehicle along the longitudinal direction YE in the image, depending on the angle of view of the wide-angle lens. The threshold Sb is set for each feature point such that the threshold Sb becomes longer as the location of the feature point recedes towards one side or the other side in the width direction YW from the center portion in the width direction YW in the image.

Thus, the process executes the determination of step S220 and the determination of step S230 for each feature point, based on a plurality of feature points captured at cameras 11, 12, 13 and 14 when the vehicle is moving.

The processing unit 40 selects a plurality of feature points and a plurality of optical flows used for an obstacle recognition and registers them.

Specifically, the processing unit 40 registers a plurality of feature points which satisfy a condition in which the flow length is larger than or equal to the threshold Sa and the determination at step S220 is YES, and the flow length is larger than or equal to the threshold Sb and the determination at step S230 is YES.

In other words, the processing unit 40 registers a plurality of feature points and a plurality of optical flows which constitute an object other than a far-distance stationary object and the road surface (i.e. the ground).

Hereinafter, the plurality of feature points thus registered are determined as a plurality of registered feature points, and the plurality of optical flows thus registered are determined as a plurality of registered optical flows.

Next, the processing unit 40 as an obstacle recognition unit performs, at step S250, clustering is performed for the plurality of registered feature points using the plurality of registered optical flows. In other words, the processing unit 40 divides the plurality of registered feature points into a plurality of aggregates.

For example, the process recognizes the aggregate of the registered feature points, in which a distance between adjacent two registered feature points among the plurality of registered feature points is less than a predetermined value, and the moving directions included in the registered optical flows are the same, to be an object.

Thus, the plurality of registered feature points in the image are divided into a plurality of aggregates. Then, the plurality of aggregates are recognized as an object.

Next, at step S260, the processing unit 40 determines whether the plurality of objects recognized at step S250 are different from the moving objects recognized at step S130.

At this moment, the processing unit 40 recognizes the objects recognized at step S250 to be moving objects, in the case where the objects recognized at step S250 and the moving objects recognized at step S130 are positioned in the same coordinate on the image.

On the other hand, in the case where the objects recognized at step S250 and the moving objects recognized at step S130 are positioned in different coordinate on the image, the processing unit 40 does not recognize objects recognized at step S250 to be moving objects.

According to the present embodiment, the processing unit 40 recognizes an object not being recognized as a moving object at step S250 among the plurality of objects recognized at step S250, to be an intermediate obstacle.

The processing unit 40 recognizes registered feature points not being recognized as a moving object at step S260 to be an intermediate obstacle, when satisfying determination result in which step 220 is determined as YES and step 230 is determined as YES.

Next, at step S270, the processing unit 40 predicts physical values such as a speed of the intermediate obstacles recognized at step S260, from the coordinates of the registered feature points, based on a plurality of registered optical flows and the own vehicle speed Vc.

Next, at step S280, the processing unit 40 determines whether the intermediate obstacles recognized at step S260 are also detected in a plurality of images acquired by the input unit 32.

In other words, at step S280, the processing unit 40 tracks the intermediate obstacles recognized at step S260, through the plurality of images acquired by the input unit 32.

Figure 2:
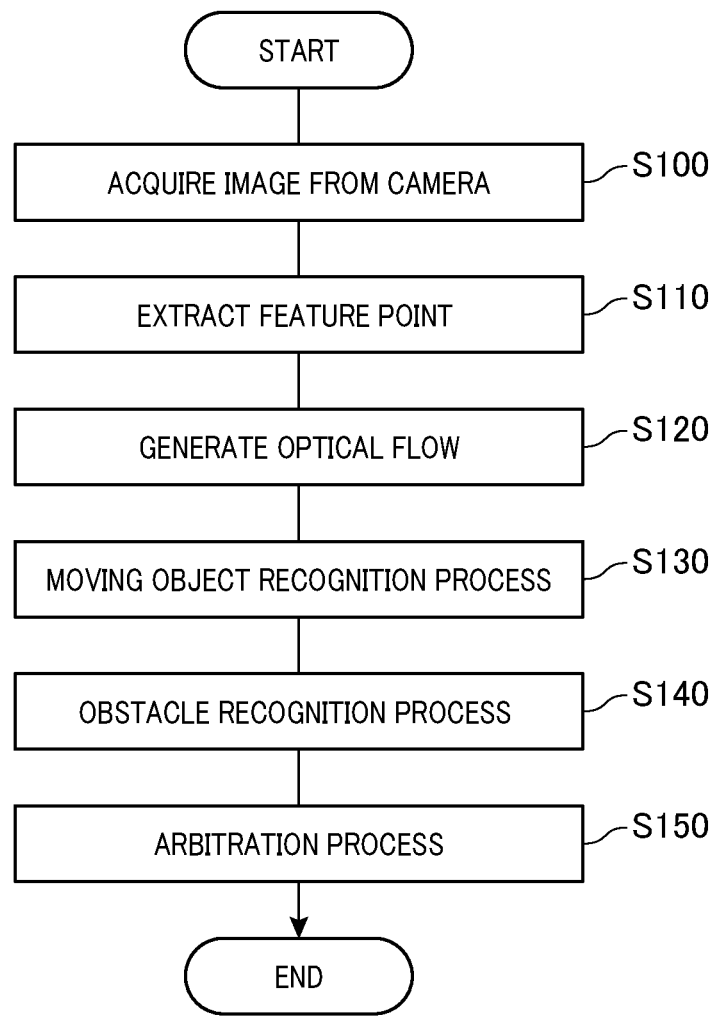
FIG. 2 is a flowchart showing an overall obstacle recognition process in the obstacle recognition device shown in FIG. 1.

At this moment, at step S280, in the case where the intermediate obstacles recognized at step S260 are also detected through a predetermined number of images, the processing unit 40 determines that the detected intermediate obstacles will be used for an arbitration process at step S150 shown in FIG. 2.

In other words, at step S280, in the case where the number of detections of the intermediate obstacles is larger than or equal to a predetermined number, the process unit 40 determines that the detected intermediate obstacles are used for an arbitration process at step S150 shown in FIG. 2.

Thus, the processing unit 40 determines the intermediate obstacles which will be used for an arbitration process at step S150 by using the images captured by the front camera 11. Similarly, the processing unit 40 determines, using the rear camera 12, the left camera 13 and the right camera 13, intermediate obstacles used for the arbitration process of step S150 for respective cameras.

Next, specific examples of an obstacle recognition process according to the present embodiment will be described with reference to FIGS. 6 and 7.

With reference to FIGS. 6 and 7, the travelling direction of the own vehicle is parallel to the longitudinal direction YE. In the images shown in FIGS. 6 and 7, a plurality of buildings touching the horizontal line Sh are present as stationary objects in the distance, and a plurality of optical flows Ka are shown on the plurality of buildings.

In the images shown in FIGS. 6 and 7, a road surface (i.e. the ground) is present as a stationary object, and a plurality of optical flows Ku are shown on the road surface.

Further, a pedestrian is present in the image shown in FIG. 6, in which a plurality of optical flows Km is shown on the pedestrian. Also, a plurality of optical flows Ky are shown near the foot of the pedestrian (i.e. near the road surface). In FIG. 7, an obstacle is present in an area in front of the own vehicle in the travelling direction, moving from the stopped state, and a plurality of optical flows Kd are shown on this obstacle.

In the images shown in FIGS. 6 and 7, the optical flow Ku in the plurality of optical flows Ka, Ku, Km and Ky is removed at step S220, and the optical flows Ka and Ky are removed at step S230.

Thus, in the case of image shown in FIG. 6, the plurality of optical flows Km are determined as registered optical flows at step S250, and clustering is performed for the plurality of optical flows Km to be recognized as an obstacle.

Hence, an object recognized using the plurality of optical flows Km (i.e. pedestrian) is recognized as a moving object at step S270 but is not recognized as an intermediate obstacle.

On the other hand, in a case of the image shown in FIG. 7, the plurality of optical flows Km and Kd are determined as registered optical flows at step S250, and clustering is performed for the plurality of optical flows Km and Kd to be recognized as an obstacle.

In other words, in FIG. 7, an object recognized with the plurality of optical flows Km and an object recognized with the plurality of optical flows Kd are present separately.

However, the object recognized with the plurality of optical flows Km is a pedestrian, that is a moving object. Hence, the object recognized with the plurality of optical flow Km is not recognized as an intermediate obstacle. As a result, an object recognized with the plurality of optical flows Kd is recognized as an intermediate obstacle.

According to the above-described embodiment, the obstacle recognition device 30 is adapted for a vehicle provided with cameras 11, 12, 13 and 14 for capturing images around the vehicle. The obstacle recognition device 30 recognizes obstacles based on the image data captured by the cameras 11, 12, 13 and 14. The processing unit 40 sequentially acquires, at step S100, images repeatedly captured by the cameras, when the determination at step S200 is YES in which the vehicle is determined as moving.

The processing unit 40 extracts, at step S110, a plurality of feature points included in the image data sequentially acquired. At step S120, the processing unit 40 calculates motion distances of a plurality of feature points (i.e. flow length) between a previous acquired image data and a currently acquired image data.

The processing unit 40 determines, for each feature point, whether a motion distance of a plurality of feature points is larger than or equal to the threshold Sa.

At step S230, the processing unit 40 determines whether each motion distance of the plurality of feature points is less than the threshold Sb. Thus, it is determined for the plurality of feature points whether they constitute an objects other than the ground in the image.

The threshold Sb is set such that the farther the location of the plurality of feature points from the own vehicle along the longitudinal direction YE in the image, the smaller the threshold Sb is.

The stationary object present in the distance according to the present embodiment is determined as a stationary object which touches the horizontal line Sh in the image and the distance between the portion touching the horizontal line and the cameras 11, 12, 13 and 14 is larger than or equal to 20 meters.

Then, the processing unit 40 determines a plurality of feature points in which the motion distance is larger than or equal to the threshold Sa and is larger than or equal to the threshold Sb, to be an obstacle.

Hence, in this case, the following effects and advantages can be obtained, compared to a case where an obstacle is detected based on an optical flow of a plurality of optical flows excluding a plurality of feature points constituting a stationary object and a moving object among the plurality of feature points extracted at step S110.

In other words, according to the present embodiment, the number of feature points used for recognizing the obstacle can be increased. Thus, obstacles in the image can be accurately detected.

Further, according to the present embodiment, the processing unit 40 determines a plurality of feature points which satisfies the above-described determination and a plurality of feature points which is not recognized as a moving object, to be an obstacle. Thus, the obstacle recognition device 30 that detects an obstacle present between a moving object and a stationary object can be provided.

Other Embodiments

1) According to the above-described embodiments, it is exemplified that when a distance between a touched portion of a stationary object touching the horizontal line among stationary objects in the image and the front camera 11 is larger than or equal to a predetermined distance (e.g. 20 meters), the stationary object is determined as a far-distance stationary object.

Alternatively, the following cases (a) and (b) can be applied.

(a) A stationary object among stationary objects in the image in which the touching portion touching the horizontal line Sh is located in a region 70 opposite to the own vehicle with respect to the intermediate portion in the longitudinal direction YE (i.e. upper half area in FIG. 6) may be determined as a far-distance stationary object.

The same applies to a case where an obstacle is detected using an image captured by the rear camera 12, the left camera 13 and the right camera 14 instead of using the front camera 11.

(b) In the image, a boundary line is assumed as a virtual line extending in a lateral direction passing thorough a portion overlapping the optical axis of incoming light entering the front camera 11. A stationary object among stationary objects in the image in which the touching portion touching the horizontal line Sh is located in a region opposite to the own vehicle with respect to the boundary line in the longitudinal direction YE is determined as a far-distance stationary object.

The same applies to a case where an obstacle is detected using an image captured by the rear camera 12, the left camera 13 and the right camera 14 instead of using the front camera 11.

(2) According to the above-described embodiments, as an example, a wide-angle lens (i.e. fish-eye lens) is used for each of the cameras 11, 12, 13 and 14. Instead of using the wide-angle lens, a telephoto lens may be used. Alternatively, a standard lens having an intermediate angle of view between the telephoto lens and the wide-angle lens may be used.

(3) According to the above-described embodiments, as an example, a case is described in which the processing unit 40 sequentially acquires image data repeatedly captured by the cameras 11 to 14, when determined that the vehicle is moving.

However, instead of the above-described case, when determined that the vehicle is stopped, the processing unit 40 may sequentially acquire the image data repeatedly captured by the camera 11 to 14.

(4) According to the above-described embodiments, as an example, a case is described in which a distance between a portion where the stationary object touches the horizontal line and the front camera 11 is larger than or equal to a predetermined distance (e.g. 20 meters), the stationary object is defined as a far-distance stationary object.

However, alternatively, the predetermined distance for determining the stationary object to be the far-distance stationary object may be set to be a distance other than 20 meters. In other words, the stationary object may be determined as a far-distance stationary object when a distance between a portion where the stationary object touches the horizontal line and the front camera 11 is larger than or equal to a predetermined distance other than 20 meters.

(5) It should be noted that the present disclosure is not limited to the above-described embodiments but may be modified in various manners without departing from the scope of the claims. The above-described respective embodiments are mutually related and may be appropriately combined except a case where combination between embodiments is apparently impossible. Further, in the respective embodiments, each element in the embodiment is not necessarily required except where the element is specified as necessary or theoretically necessary. In the above-described embodiments, in the case where numerical numbers such as the number of elements, numbers, range and the like are mentioned, it is not limited to that specific number unless the specific number is described as necessary or theoretically limited to the specific number. Moreover, in the case where a shape of the elements or a positional relationship is mentioned in the respective embodiments, it is not limited to that shape or the positional relationship except that it is theoretically limited to the specific shape or the positional relationship unless otherwise specified.

According to a first aspect described in the above-described embodiments and all of or a part of other embodiments, the obstacle recognition device is applied to a vehicle provided with a camera that captures an image around the vehicle. The obstacle recognition device is configured to detect an obstacle based on the image captured by the camera.

The obstacle recognition device is provided with an acquiring unit that sequentially acquires images repeatedly captured by the camera and a feature point extracting unit that extracts a plurality of feature points included in the image sequentially acquired by the acquiring unit.

The obstacle recognition device is provided with a calculation unit that calculates each motion distance of the plurality of feature points on the image between the image previously acquired by the acquiring unit and the image currently acquired by the acquiring unit.

The obstacle recognition device includes a first determination unit that determines whether each motion distance of the plurality of feature points is larger than or equal to a first threshold, and a second determination unit that determines whether each motion distance of the plurality of feature points is larger than or equal to a second threshold.

The obstacle recognition device includes an obstacle recognition unit that recognizes an obstacle. The second threshold is set for each feature point such that the farther the location of the plurality of feature points from the own vehicle along the longitudinal direction in the image, the smaller the second threshold is.

The obstacle recognition unit is configured to determine feature points to represent an obstacle that satisfy a determination result, in which the first determination unit determines that the motion distance is larger than or equal to the first threshold and the second determination unit determines that the motion distance is larger than or equal to the second threshold.

Here, the first determination unit determines whether each motion distance of the plurality of feature points is larger than or equal to the first threshold, whereby it is determined whether the plurality of feature points constitute an object excluding a far-distance stationary object in each image.

The second determination unit determines whether each motion distance of the plurality of feature points is larger than or equal to the second threshold, whereby it is determined whether the plurality of feature points constitute an object other than the ground in the image.

Here, as a far-distance stationary object, a stationary object in which a portion touches the horizontal line in the image and a distance between the portion touching the horizontal line and the camera is larger than or equal to a predetermined distance may be determined. The predetermined distance is 20 meters, for example.

As a far-distance stationary object, a stationary object in which a portion touches the horizontal line in the image and the portion touching the horizontal line is located at a region opposite to the camera with respect to an intermediate portion in the longitudinal direction of the image may be determined.

According to a second aspect, a movement determination unit that determines whether a vehicle is moving is provided, and the acquiring unit sequentially acquires images repeatedly captured by the camera in response to a determination in which the determination unit determines that the vehicle is moving.

Thus, an obstacle can be detected when the vehicle is moving.

According to the third aspect, a moving object recognizing unit that recognizes a moving object around the vehicle in accordance with a plurality of feature points is provided, and the obstacle recognition unit determines feature points satisfying the determination result and being not recognized as a moving object by the moving object determination unit, to be an obstacle.

Thus, the obstacle can be accurately detected.

According to the fourth aspect, the camera captures an image around the vehicle through the wide-angle lens. The second threshold is set to be larger as the locations of the plurality of feature points goes towards one side of the image from the center portion of the image in the width direction or goes towards the other side of the image in the width direction.

Thus, the second threshold can be changed depending on the angle view of the wide-angle lens.

CONCLUSION

A first aspect of the present disclosure provides an obstacle recognition device applied to a vehicle provided with a camera (11, 12, 13, 14) that captures an image around the vehicle, detecting an obstacle based on the image captured by the camera. The obstacle recognition device incudes: an acquiring unit (S100) that sequentially acquires the image repeatedly captured by the camera; a feature point extracting unit (S110) that extracts a plurality of feature points of an object included in the image sequentially acquired by the acquiring unit; a calculation unit that calculates each motion distance of the plurality of feature points on the image between the image previously acquired by the acquiring unit and the image currently acquired by the acquiring unit; a first determination unit (S220) that determines whether each motion distance of the plurality of feature points is larger than or equal to a first threshold; a second determination unit (S230) that determines whether each motion distance of the plurality of feature points is larger than or equal to a second threshold; and an obstacle recognition unit (S250) that recognizes an obstacle.

The second threshold is set for each feature point such that the farther the location of the plurality of feature points from the vehicle along a longitudinal direction (YE) in the image, the smaller the second threshold is; and the obstacle recognition unit is configured to determine feature points to represent an obstacle that satisfy a determination result in which the first determination unit determines that the motion distance is larger than or equal to the first threshold and the second determination unit determines that the motion distance is larger than or equal to the second threshold.

According to the first aspect, the first determination unit determines whether each motion distance of the plurality of feature points is larger than or equal to the first threshold, whereby it is determined whether the plurality of feature points constitute an object excluding a far-distance stationary object in each image.

The second determination unit determines whether each motion distance of the plurality of feature points is larger than or equal to the second threshold, whereby it is determined whether the plurality of feature points constitute an object other than the ground in the image.

Accordingly, the obstacle recognition unit recognizes feature points that satisfy a determination result in which it is determined that the plurality of feature points constitute an object excluding a far-distance stationary object in each image, and constitute an object except the ground in each image, to be an obstacle.

The following effects and advantages can be obtained, compared to a case where an obstacle is detected based on motion distances of a plurality of feature points excluding a plurality of feature points constituting a stationary object and a moving object among extracted plurality of feature points.

In other words, according to the first aspect, the number of the plurality of feature points used for recognizing an obstacle can be increased. Thus, obstacles can be accurately detected from the image.

What is claimed is:

1. An obstacle recognition device of a vehicle provided with a camera that captures images around the vehicle, detecting an obstacle based on the images captured by the camera, the obstacle recognition device comprising:
    an acquiring unit that sequentially acquires the images repeatedly captured by the camera;
    a feature point extracting unit that extracts a plurality of feature points of an object included in the images sequentially acquired by the acquiring unit;
    a calculation unit that calculates each motion distance of the plurality of feature points on the images between an image previously acquired by the acquiring unit and an image currently acquired by the acquiring unit;
    a first determination unit that determines whether each motion distance of the plurality of feature points is larger than or equal to a first threshold;
    a second determination unit that determines whether each motion distance of the plurality of feature points is larger than or equal to a second threshold; and
    an obstacle recognition unit that recognizes an obstacle, wherein
    the second threshold is set for each feature point such that the farther the location of the plurality of feature points from the vehicle along a longitudinal direction in a respective image, the smaller the second threshold is; and
    the obstacle recognition unit is configured to determine feature points to represent an obstacle that satisfy a determination result in which the first determination unit determines that the motion distance is larger than or equal to the first threshold and the second determination unit determines that the motion distance is larger than or equal to the second threshold.

2. The obstacle recognition device according to claim 1 further comprising a movement determination unit that determines whether the vehicle is moving or not, wherein
    the acquiring unit sequentially acquires the images repeatedly captured by the camera in response to a determination in which the movement determination unit determines that the vehicle is moving.

3. The obstacle recognition device according to claim 1 further comprising a moving object recognizing unit that recognizes a moving object around the vehicle in accordance with the plurality of feature points, wherein
    the obstacle recognition unit determines the feature points satisfying the determination result and being not recognized as the moving object by the moving object recognizing unit, to be the obstacle.

4. The obstacle recognition device according to claim 1, wherein
- the camera is configured to capture an image around the vehicle through a wide-angle lens; and
- the second threshold is set to be larger as locations of the plurality of feature points approaches towards one side of the image from a center portion of the image in a width direction or approaches towards the other side of the image in the width direction.

* * * * *